(12) United States Patent
McCrary et al.

(10) Patent No.: US 7,992,278 B2
(45) Date of Patent: Aug. 9, 2011

(54) METHOD OF OPERATING A PRODUCTION LINE

(75) Inventors: Kevin E. McCrary, Graham, WA (US); Arthur C. Day, Seattle, WA (US); John Edwards, Kent, WA (US); Richard A. Hawkins, Puyallup, WA (US); Mark D. Higgins, Woodinville, WA (US); Philip E. Johnson, Auburn, WA (US); John A. Mittleider, Kent, WA (US); James R. Schindler, Lynnwood, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 477 days.

(21) Appl. No.: 12/257,695

(22) Filed: Oct. 24, 2008

(65) Prior Publication Data
US 2010/0028123 A1    Feb. 4, 2010

Related U.S. Application Data

(62) Division of application No. 10/904,710, filed on Nov. 24, 2004, now Pat. No. 7,461,711.

(51) Int. Cl.
*B23P 11/00* (2006.01)
(52) U.S. Cl. ............ 29/430; 29/428; 29/429; 104/284; 104/281; 104/285; 180/9.1; 180/9.5; 244/50; 305/185; 414/749.2
(58) Field of Classification Search ............ 29/428, 29/429, 430; 104/281; 180/9.1, 9.5; 305/185; 198/617; 244/50; 414/749.2
See application file for complete search history.

(56) References Cited

U.S. PATENT DOCUMENTS

| | | |
|---|---|---|
| 4,789,037 A | 12/1988 | Kneebone |
| 4,828,059 A | 5/1989 | Naito et al. |
| 4,842,086 A * | 6/1989 | Michna ............ 180/9.1 |
| 5,088,593 A | 2/1992 | Lewin |
| 5,172,803 A | 12/1992 | Lewin |
| 5,363,935 A | 11/1994 | Schempf et al. |
| 5,435,405 A | 7/1995 | Schempf et al. |
| 5,894,901 A | 4/1999 | Awamura et al. |
| 6,046,139 A | 4/2000 | Blohowiak et al. |
| 6,211,589 B1 | 4/2001 | Ahlstrom et al. |
| 6,860,383 B2 | 3/2005 | Veit et al. |
| 6,889,783 B1 | 5/2005 | Moore et al. |

OTHER PUBLICATIONS

A.C. Day et al., "Flywheels with All-Passive, Non-Contact Magnetic Suspensions", Electric Energy Storage Applications and Technology Conference, Apr. 15-17, 2002, San Francisco, CA.

(Continued)

*Primary Examiner* — Richard Chang
(74) *Attorney, Agent, or Firm* — Ostrager Chong Flaherty & Broitman P.C.

(57) ABSTRACT

A method of operating a production line comprises the steps of supporting equipment in the production line on a plurality of crawlers comprising at least one rolling track and a structural support for supporting the equipment. A first plurality of lifting magnets coupled to an interior surface of said at least one rolling track is configured to oppose a second plurality of lifting magnets coupled to an exterior surface of said structure support to lift the structural support, such that the structural support floats between and within said at least one rolling track. The magnetic fields experienced by the first and second plurality of lift magnets are adjusted to translate the at least one rolling track, such that the crawlers move along the production line.

19 Claims, 4 Drawing Sheets

OTHER PUBLICATIONS

K.Y. Blohowiak et al., "Evaluation of YBa2Cu3O7-x Bulk Superconductors for High Field Magnet Applications", IEEE Transactions on Applied Superconductivity, vol. 3, No. 1, Mar. 1993.

R.W. Dull et al., "Fundamentals of Superconductors", A Teacher's Guide to Superconductivity for High School Students, Sep. 1994, Largo, Florida.

A.C. Day et al., "Design and Testing of the HTS Bearing for a 10kWh Flywheel System", Superconductor Science and Technology, vol. 15, No. 5, May 2002 (PASREG Special Issue: The 3rd International Workshop on Processing and Applications of Superconducting (RE)BCO Large Grain Materials, Seattle, WA, Jul. 11-13, 2001).

A.C. Day et al., "Temperature and Frequency Effects in a High-Performance Superconducting Bearing", Applied Superconductivity, IEEE Transactions on, vol. 13, Issue 2, Part 2, pp. 2179-2184, Jun. 2003.

Thomas Penick, "Magnetic Levitation Vehicles", Electrical and Computer Engineering Seminar EE 155, published on the Internet, Nov. 11, 1998.

* cited by examiner

METHOD OF OPERATING A PRODUCTION LINE

RELATED APPLICATION

This application is a divisional application of, and claims priority from, pending prior application Ser. No. 10/904,710, filed Nov. 24, 2004.

TECHNICAL FIELD

This application relates generally to aeronautical vehicle manufacturing systems and, more particularly, to a system and method for adjusting the location of a moving production line and for providing easy access to vehicle components on that production line.

BACKGROUND

Traditionally, aircraft have been manufactured in a single stationary location. During the manufacturing or "build-up" of the aircraft, components and systems are brought to a designated location in which the fuselage of the aircraft is stationed. Due to a desire to increase the efficiency of aircraft production, to minimize congestion of systems and components in a single location, and to minimize the amount of inventory existing at any one time within a facility, some aircraft are now being manufactured through the use of a moving production line.

A moving production line allows a fuselage to be transitioned from station to station where components and systems are installed. At each station a designated set of tasks are performed. Respective components and systems are delivered to and located near the appropriate station where they are to be installed onto the fuselage. Thus, each station has a minimal amount of associated inventory. Also, each station has a minimal amount of equipment and personal to perform the designated tasks for that station. Thus, there is less congestion in any single location and improved efficiency.

A desire exists for the ability to change the location of a moving production line from one location to another in a short period of time. Although a moving production line provides the above-stated advantages, a moving production line is limited in mobility and flexibility. In general, a moving production line consists of a rail system that is fixed to a plant facility floor. Multiple carriers, carrying various aircraft components and sub-assemblies, such as the aircraft fuselage, are pulled via chain from station to station. The rail system is stationary and thus cannot be moved to a different location without a considerable amount of time and expense in dismantling, transporting, and rebuilding the rail system. Also, the carriers are locked in a particular order and cannot easily be altered or relocated.

In addition, a desire also exists for an aircraft under production or components thereof to be positioned close to the floor of a production facility for ease of manufacturing. Low positioning, for example, of a fuselage allows personal to walk directly onto the fuselage without use of ladders or other lifting or escalating devices. Current rail systems fail to provide such positioning.

Thus, there exists a need for an improved moving production line system that allows for the repositioning of a moving production line and that allows for systems and components of an aircraft to be in low easy to access vertical positions during manufacturing and assembly of that aircraft.

SUMMARY

The disclosure provides an equipment-carrying crawler that includes a rolling track and a structural support. The structural support supports equipment. Lifting magnets are coupled to the rolling track and to the structural support. The lifting magnets are configured to oppose each other, lift the structural support, and aid in translation of the rolling track.

The disclosure provide several advantages. One such advantage is the provision of a production line crawler that is capable of supporting vehicle components within a production line, as well as being translocated. The utilization of the crawler allows for the translation of vehicle components along a production line in addition to the ability of moving or changing the location of the production line within a manufacturing facility.

Another advantage provided by the disclosure is the provision of a production line cradle system in which aircraft components may be translated along a production line at a vertical level that provides easy access thereof for efficient performance of manufacturing tasks.

Furthermore, a simple compact passive system is provided for lifting and transporting vehicle components from station to station in a production line.

The disclosure itself, together with further objects and attendant advantages, will be best understood by reference to the following detailed description, taken in conjunction with the accompanying drawing.

DETAILED DESCRIPTION

In each of the following Figures, the same reference numerals are used to refer to the same components. While the disclosure is described with respect to a system for adjusting the location of a moving production line and for providing easy access to vehicle components on that production line, the principles of the disclosure may be adapted for various applications and systems, such as production line applications, the transfer of a vehicle, vehicle components, equipment, or machinery between locations, or other applications and systems known in the art. The systems and methods may be applied to both aeronautical and non-aeronautical systems and components.

The systems and methods disclosed may be utilized to move satellites, munitions, optical equipment, equipment containing chemical and biological agents, general-purpose cleaning equipment, and various other equipment. The munitions may be chemical, biological, nuclear, or conventional. The disclosure may, for example, be used to transport or hold a telescope assembly used in a laboratory test, or it may be used to move and to hold heavy equipment stable during precise assembly steps, or it may also be used to move equipment into laboratories, factories, and cleaning rooms, or to carry equipment to remote locations.

In the following description, various operating parameters and components are described for one constructed embodiment. These specific parameters and components are included as examples and are not meant to be limiting.

Figure 1:
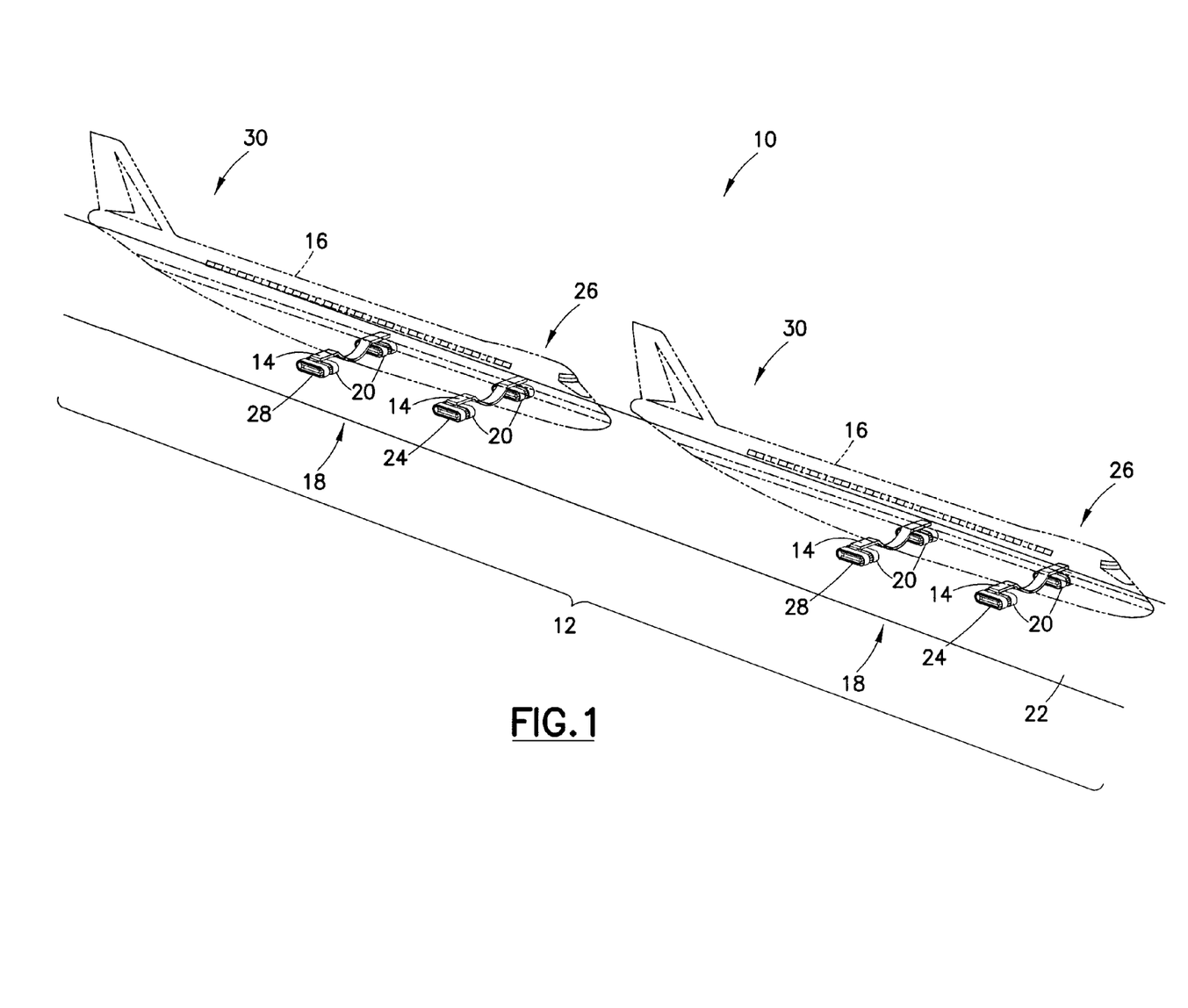
FIG. 1 is a perspective view of a production line in accordance with one embodiment.

Referring now to FIG. 1, a perspective view of a production line 10 is shown within a manufacturing facility 12. The production line 10 transitions or moves multiple production line cradle systems 14 carrying equipment or vehicle components 16, such as aircraft fuselages, as shown, to various manufacturing stations 18. The term "equipment" may refer to a single component or to multiple components. The vehicle components 16 are carried along the production line 10 from station to station. At each station 18 a pre-assigned set of manufacturing tasks are performed. The cradle systems 14 include multiple equipment or production line crawlers 20, which are able to travel along the production line 10. The use of the crawlers 20 also allows the production line 10 to be translocated to different locations. The production line 10 is not rigidly fixed to the floor 22 of the facility 12, like that of a traditional production line track system.

In the production line 10 the vehicle components or fuselages 16 are being carried by the cradle systems 14. Each fuselage 16 is supported by two cradle systems. A first cradle system 24 supports a front portion 26 of the fuselages 16 and a second cradle system 28 supports a rear portion 30 of the fuselages 16. Although two cradle systems are utilized and are shown in a single arrangement, any number of cradle systems may be utilized in various arrangements. The crawlers may be used to carry equipment within a production line as shown or may be used to carry equipment in various other applications, some of which are mentioned above. The crawlers may be of various sizes to accommodate the various applications.

The crawlers 20 may be setup and associated with various stations along the production line 10. Each crawler 20 may have station associated tooling and equipment required to perform predetermined tasks for that station. Since the crawlers 20 are mobile they may be positioned in different orders and assigned to different stations. In addition, when maintenance is to be performed on a particular crawler it may be easily replaced with a similar crawler for minimum production line down time.

Figures 2, 3:
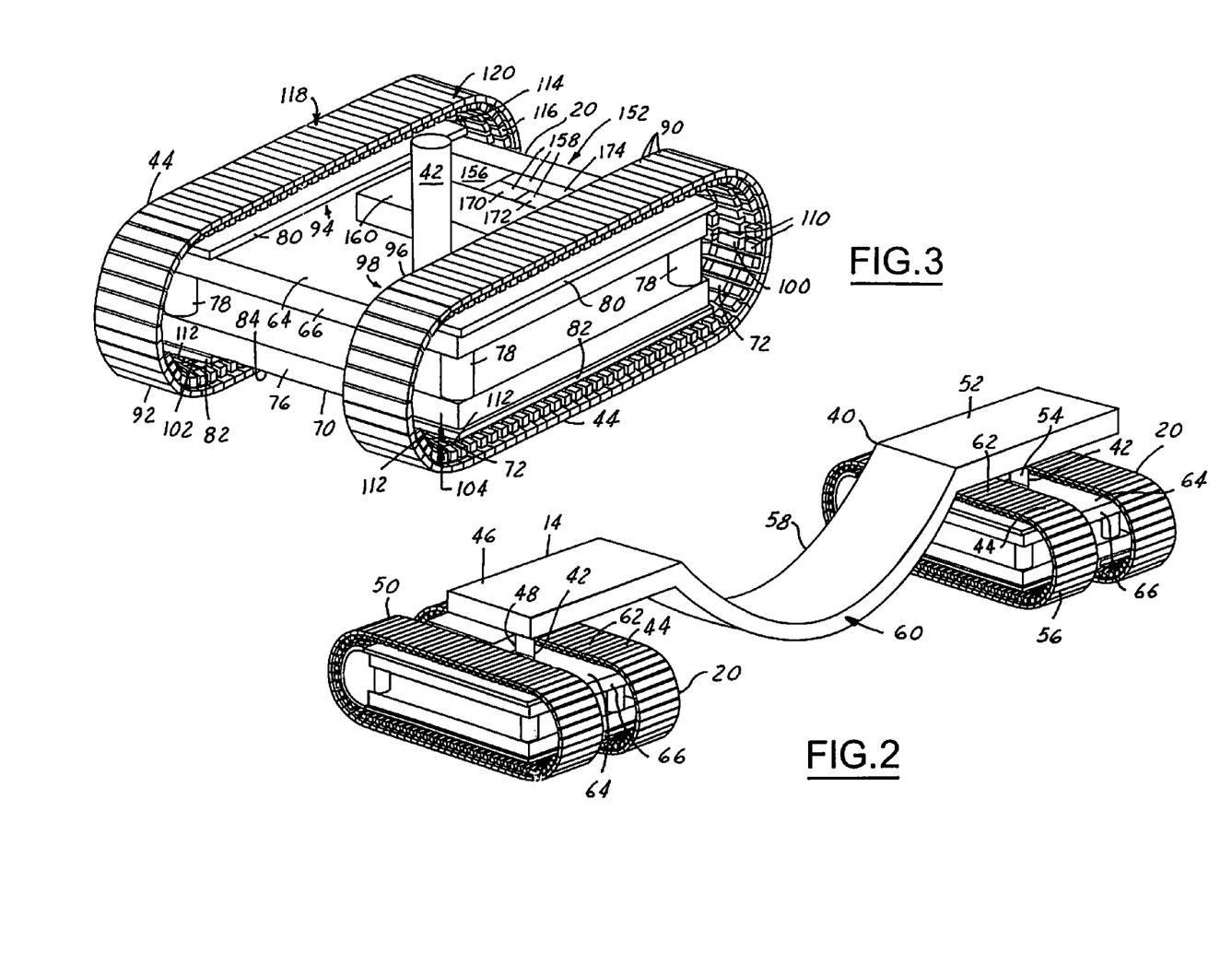
FIG. 2 is a perspective view of a production line cradle system in accordance with one embodiment.
FIG. 3 is a perspective view of a production line crawler in accordance with one embodiment.

Referring now to FIG. 2, a perspective view of the production line cradle system 14 is shown. The cradle system 14 includes a pair of the production line crawlers 20 and a cradle 40 that spans between the crawlers 20. The cradle 40 supports one or more vehicle components and systems. The cradle 40 is coupled to the crawlers 20 via straddle support members 42. The cradle 40 may hang over the tracks 44 of the crawlers 20, as shown, in a lateral configuration or may hang between the crawlers 20 in a fore/aft configuration (not shown). The cradle 40 includes a first member 46 that is coupled to a first support member 48 of a first crawler 50. The cradle 40 also includes a second member 52 that is coupled to a second support member 54 of a second crawler 56. A "U-shaped" element 58 is coupled between the members 46 and 52. The U-shaped element 58 has similar shape as that of the exterior of an aircraft fuselage for proper support of the fuselage by the cradle 40.

Although the support members 42 are shown as being in the form of single shafts supporting the cradle 40, they may be in the form of multiple shafts or supporting members and have any number of attachment points. The support members 42 may also be in various arrangements known in the art.

The lower portion 60 of the U-shaped element 58 hangs below the top surfaces 62 and 64 of the rolling tracks 44 and below the upper platforms 66 of the crawlers 20, respectively. This low hanging orientation of the U-shaped element 58 provides easy access to vehicle components residing on the cradle 40.

Figure 4:
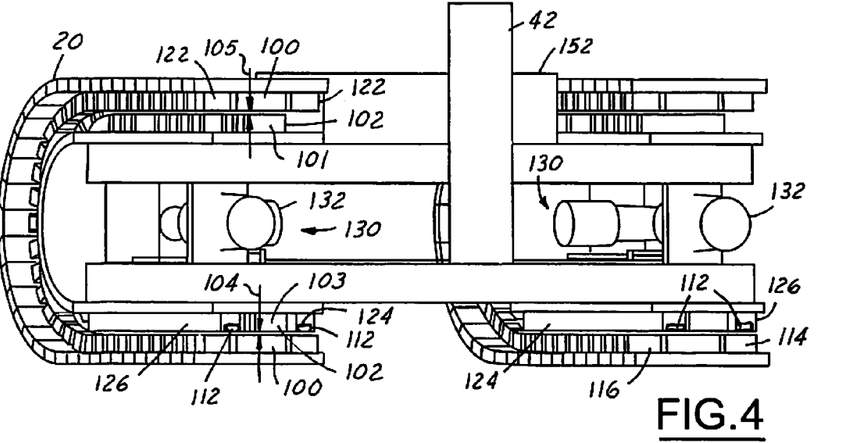
FIG. 4 is a cross-sectional view of the production line crawler of FIG. 3.

Referring now to FIGS. 3 and 4, a perspective view and a cross-sectional view of the production line crawler 20 are shown. The crawler 20 includes a pair of the rolling tracks 44, a strongback or structural support 70, and multiple lift magnets 72 that are coupled therebetween and provide lift to the structural support 70. The structural support 70 in essence floats between and within the rolling tracks 20 via the lift magnets 72.

The structural support 70 includes the upper platform 66 and the lower platform 76 coupled via spacers 78. A first pair of magnet mounting plates 80 is coupled to the upper surface 64. A second pair of magnet mounting plates 82 is coupled to the lower surface 84 of the lower platform 76. The vertical support member 42 is coupled to the upper platform 66 and may be coupled to one or more vehicle components or to a cradle, as shown in FIG. 2.

Each rolling track 44 includes a series of treads 90 that are linked to each other in a continuous format. Each tread 90 is translated across and around an end of the structural support 70. A first rolling track 92 translates around a first end 94 of the structural support 70 and a second rolling track 96 translates around a second end 98 of the structural support 70. Each rolling track 44 may be covered in rubber or similar material to protect travel surfaces and provide some energy absorption during travel from uneven surfaces.

The lift magnets 72 include a first set of lift magnets 100 that are coupled to the rolling tracks 44 and a second set of lift magnets 102 that are coupled to the structural support 70. The first lift magnets 100 are directed at and have the same polarity as the second lift magnets 102. The second lift magnets 102 include upper lift magnets 101 and lower lift magnets 103 that are mounted on the mounting plates 80 and 82, respectfully. The upper lift magnets 101 are used to maintain separation between the tracks 44 and the structural support 70. The upper lift magnets 101 or a portion thereof may attract the lift magnets 100 to the extent to which they provide stability in the track. The lower lift magnets 103 are used to lift the structural support 70. The strength of the opposition between the lift magnets 72 correlates to the size of the floating lift gap 104 between the first lift magnets 100 and the lower lift magnets 103 and to the upper separation gap 105 between the first magnet 100 and the upper lift magnets 101. Also, in general, a smaller gap 104 increases the amount of weight that can be lifted. As opposing magnets of the same polarity are brought together, the smaller the gap therebetween the greater the opposing force, which enables the lifting of an increased amount of weight.

The crawler 20 also includes multiple stability magnets 110 and superconducting devices 112. The stability magnets 110 include a first set of stability magnets 114 and a second set of stability magnets 116. The first stability magnets 114 are coupled on an outward end 118 of the rolling tracks 44. The second stability magnets 116 are coupled on an inboard end 120 of the rolling tracks 44. The first lift magnets 100 reside between the first stability magnets 114 and the second stability magnets 116. The superconducting devices 112 reside within cryostats 122 on the lower magnet mounting plates 82. The second lift magnets 102 reside between an outer cryostat 124 and an inner cryostat 126.

In operation, the stability magnets 110 generate magnetic stability fields. The superconducting devices 112 react to the magnetic stability fields and generate current therein, which opposes changes in the stability fields as experienced by the superconducting devices 112. In so doing, the superconducting devices 112 maintain position of the rolling tracks 44 relative to the structural support 70. The stability magnets 110 may provide some lift, but are primarily utilized for stability of the structural support 70. The lift magnets 72 provide a majority of the lift.

The crawler 20 includes a cooling circuit 130 for cooling the superconducting devices 112. The superconducting devices 112 may be high temperature superconducting devices or low temperature superconducting devices. The superconducting devices 112 may be in the form of superconducting crystals or magnets. The cooler the superconducting devices 112 are maintained the stronger and more effective they are in preventing any shifting between the rolling tracks 44 and the platform 70.

The cooling circuit 130 includes the chilling devices, such as the cryostats 122, and may include various cryogenic devices or a cold head, as designated by items 132. The cryostats 122 may be in the form of a liquid nitrogen or liquid helium cooling bath. When high temperature superconducting devices are utilized, the cooling bath contains liquid nitrogen that may be maintained at temperatures approximately between 60-80.degree. K. In one embodiment, the temperature of the liquid nitrogen bath is maintained at approximately 77.degree. K. The stated temperatures are for example purposes. Of course, the liquid nitrogen bath may be maintained at other known or desired temperatures.

Although cryostats and superconducting devices are shown as being coupled to the lower magnet mounting plates 82, cryostats and superconducting devices may also be coupled to the upper magnet mounting plates 80 and used for further stability.

In addition, lateral arced plates 132, as shown in FIG. 4, may be coupled to the platforms 66 and 76 and also include cryostats and superconducting devices mounted thereon for added stability. As well, additional lift magnets may also be coupled to the arced plates 132 and directed at the first lift magnets 100 to prevent slack in the rolling tracks 44.

The above-stated lift magnets 72 and stability magnets 110 may be in the form of permanent magnets and generate magnetic fields naturally without the use of an external power source. In one embodiment, the lift magnets 72 are formed of Neodymium Iron Boron (NdFeB). The superconducting devices 112 are also not supplied power, but their reactance to a magnetic field depends upon the temperature in which they are maintained. In general, the superconducting devices 112 provide increased resistance to magnetic field change with a decrease in operating temperature.

Figure 5:
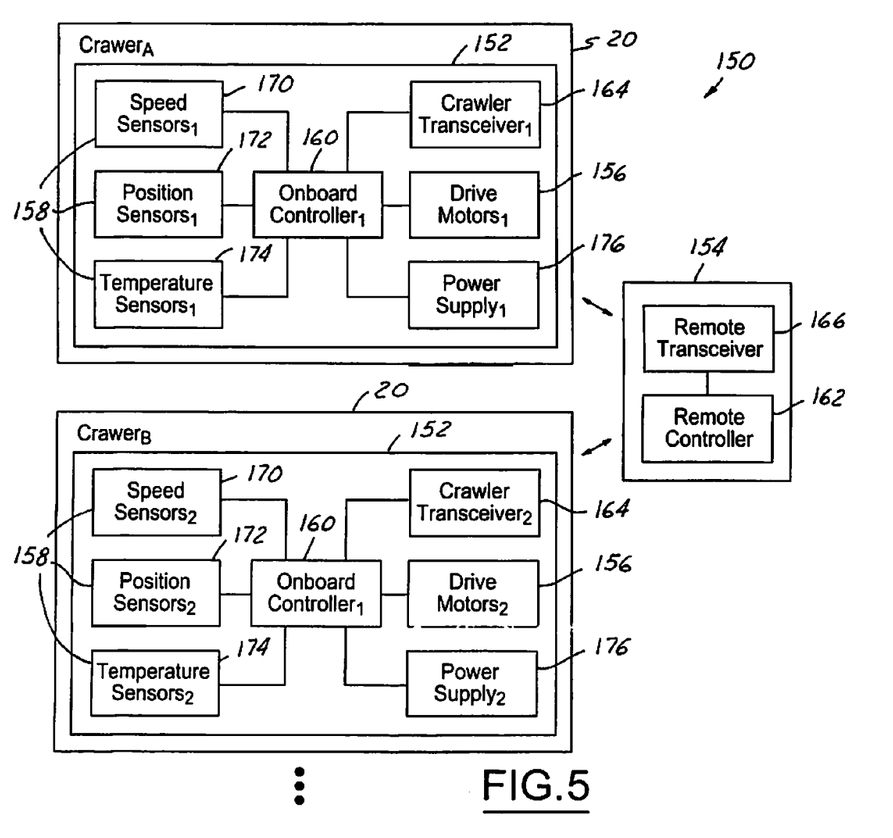
FIG. 5 is a block diagrammatic view of a crawler control system in accordance with one embodiment.

Referring now also to FIG. 5, a block diagrammatic view of a remote crawler control system 150 is shown. The remote control system 150 includes multiple crawler control systems 152 and a remotely located control center 154. The crawler control systems 152 may include drive motors 156, various sensors 158, and onboard controllers 160. The drive motors 156 are utilized to translate the rolling tracks 44. The sensors 158 are used to detect the status of the crawlers associated with the crawler control systems 152, such as the crawler 20, and components thereof. The onboard controllers 160 are coupled to the drive motors 156 and to the sensors 158 and adjust the speed, position, and temperature of the crawlers and/or components thereof in response to data received from the sensors 158. The control center 154 includes a remote controller 162, which is in communication with the onboard controllers 160 via the crawler transceivers 164 and the control center transceiver 166. The control center 154 adjusts or changes the location of the crawlers as desired.

The drive motors 156, as an example, may be in the form of induction motors. The drive motors 156 may be coupled to the upper platform 66 and generate drive magnetic fields, which react with the magnetic fields generated by the first lift magnets 100. The drive magnetic fields change in polarity and magnitude to change the direction and speed of the rolling tracks 44. The drive motors 156 may generate a drive magnetic field that either attracts or opposes the magnetic field generated by the lift magnets 100, which causes motion of the rolling tracks 44 in the appropriate direction. Since there are no contact surfaces in the actual lifting portion of the crawlers 20, in other words, since the structural support 70 is floating within the rolling tracks 44, little energy is needed to drive the rolling tracks 44. Thus, the drive motors 156 are small in size.

The sensors 158 may include speed sensors 170, position sensors 172, temperature sensors 174, as well as other sensors known in the art for detecting the status of a crawler. The crawler 20 may have a speed sensor associated with each of the rolling tracks 44. In a sample embodiment, the onboard controllers 160 adjusts the speed of the associated crawler along a production line in response to data generated from the speed sensors 170. The onboard controllers 160 adjust the position of the crawlers, such as during the translocation of a production line, in response to the data generated by the position sensors 172. The onboard controllers 160 adjust the temperature of cooling devices, such as the cryostats 122, in response to the data received from the temperature sensors 174.

The onboard controllers 160 and the remote controller 166 may be microprocessor based such as a computer having a central processing unit, memory (RAM and/or ROM), and associated input and output buses. The onboard controllers 160 may be a portion of a central vehicle main control unit, be divided into multiple controllers, or be a single stand-alone controller as shown. The remote controller 166 generates a translocate signal, which is transmitted to the onboard controllers 160 for translocating an associated production line.

Power supplies 176 also reside within the crawler control systems 152 and on the structural supports 70. The power supplies 176 supply power to the drive motors 156 and to the onboard controllers 160. The power supplies 176 may be of various types and styles known in the art.

Figure 6:
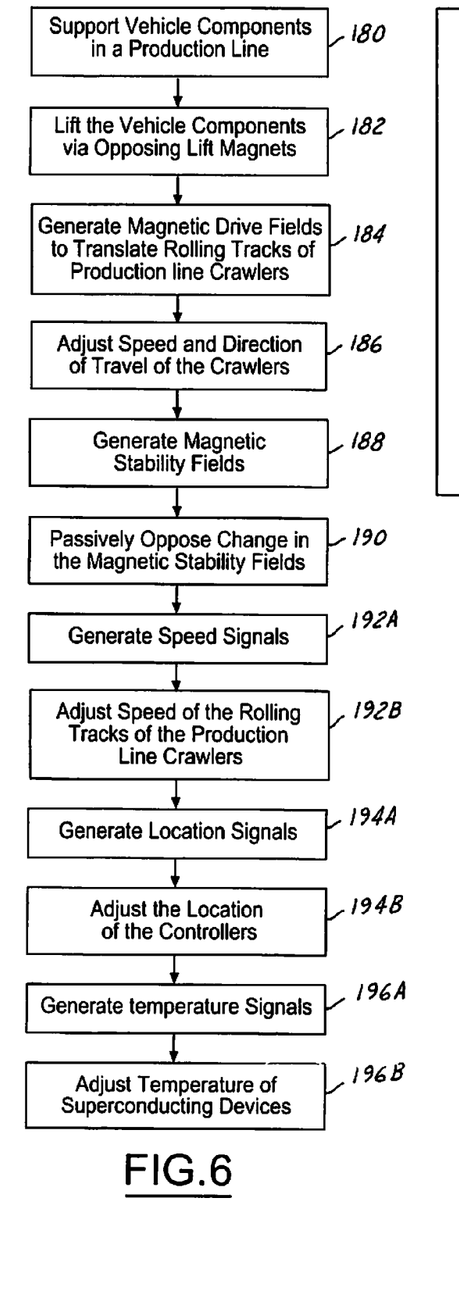
FIG. 6 is a logic flow diagram illustrating a method of operating a production line in accordance with one embodiment.
Figure 7:
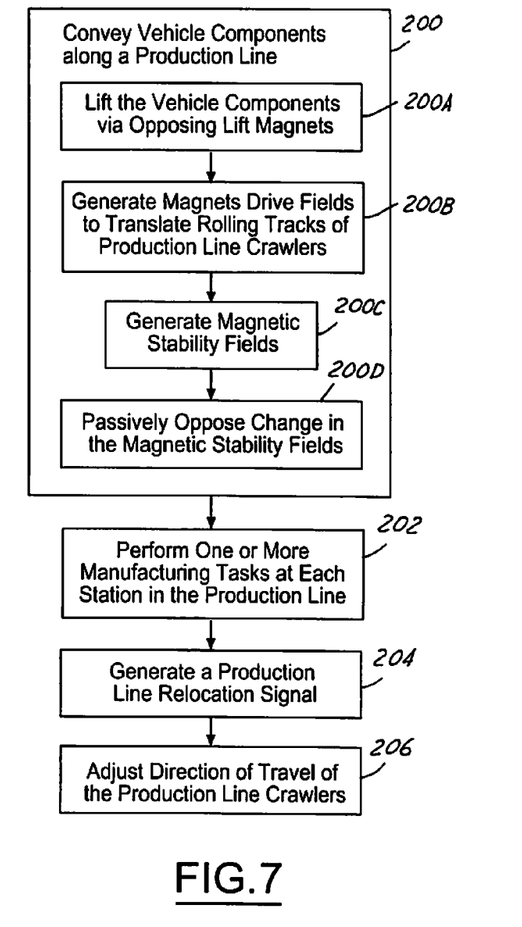
FIG. 7 is a logic flow diagram illustrating a method of manufacturing an aircraft in accordance with one embodiment.

Although the following methods of FIGS. 6 and 7 are described primarily with respect to the production line 10 of FIG. 1, the crawlers 20 of FIGS. 1-3, and of the crawler control systems 152 of FIG. 5, the methods may be easily modified and applied to other embodiments.

Referring now to FIG. 6, a logic flow diagram illustrating a method of operating a production is shown.

In step 180, the vehicle components 16, such as an aircraft fuselage and other aircraft components and sub-assemblies, are supported in the production line 10 on the crawlers 20. In step 182, the first lift magnets 100 oppose the second lift magnets 102 to provide lift to the structural support 70, thus lifting the aircraft components.

In step 184, the onboard controllers 160 utilize the drive motors 156 to generate magnetic drive fields, which interact with the lift magnet fields generated by the first lift magnets 100 and cause the rolling tracks 44 to be translated in a predetermined direction. The movement of the rolling tracks 44 allows the crawlers 20 to move along the production line 10. In step 186, the onboard controllers 160 may adjust the drive magnetic fields experienced by the first lift magnets 100 to adjust the speed and the direction of travel of the crawlers 20.

In step 188, the stability magnets 122 generate magnetic stability fields. In step 190, the superconducting devices 112 passively oppose any change in the magnetic stability fields to stabilize the rolling tracks 44 relative to the structural supports 70. In response to the stability fields, current is generated within the superconducting devices 112, which generates a resistance to change in the stability fields. This prevents lateral and vertical shifting of the rolling tracks 44 relative to the structural supports 70.

In step 192A, the speed sensors 170 generate speed signals indicative of rolling track speeds. In step 192B, the onboard controllers 160 adjust the speed of the rolling tracks 44 by changing the magnitude of the drive magnetic fields. The onboard controllers 160 adjust the direction of travel of the rolling tracks 44 by changing the polarity of the drive magnetic fields in response to the speed signals.

In step 194A, the position sensors 172 generate position or location signals indicative of the location of the crawlers 20. In step 194B, the onboard controllers 160 adjust the location of the crawlers 20 in response to the location signals. An onboard controller may adjust the speed or direction of travel of one or more of the rolling tracks of that crawler to alter the traveling direction.

In step 196A, the temperature sensors 174 generate temperature signals indicative of the temperature of the superconducting devices 112. In step 196B, the onboard controllers 160 adjust the temperature of the cryostats 122 in response to the temperature signals using techniques known in the art. Steps 180-196B may be continuously performed.

Referring now to FIG. 7, a logic flow diagram illustrating a method of manufacturing an aircraft is shown.

In step 200, the vehicle components 16 are translated or conveyed along the production line 10 to the stations 18 using multiple production line cradle systems 14. In step 200A, the first lift magnets 100 oppose the second lift magnets 102 of each crawler 20 in the cradle systems 14 to provide lift to the structural supports 70, thus lifting the aircraft components 16.

In step 200B, the onboard controllers 160 of the crawlers 20 utilize the drive motors 156 to generate magnetic drive fields, which interact with the lift magnet fields generated by the first lift magnets 100 and cause the rolling tracks 44 of the crawlers 20 to be translated in a predetermined direction. The movement of the rolling tracks 44 allows the cradle systems 14 to move to each station 18. In step 200C, the stability magnets 122 of the crawlers 20 generate magnetic stability fields. In step 200D, the superconducting devices 112 passively oppose any change in the magnetic stability fields to stabilize the rolling tracks 44 relative to the structural supports 70, as described above.

During step 200, steps 162A-166B may be performed to adjust speed, position, and direction of travel of the crawlers 20 or to adjust the temperature of any cooling device or superconducting device on the crawlers 20.

In step 202, one or more manufacturing tasks are performed at each station 18. The manufacturing tasks may include the attaching of a component or sub-assembly to the fuselages, the adjusting, attaching, coupling, testing, and/or evaluating of components or systems, the painting or coating of the fuselages or any components or systems thereon, or any other manufacturing tasks known in the art. Steps 200-202 are continuously performed.

In step 204, the remote controller 162 may generate a production line relocation signal or translocation signal for the translocating of the production line 10 to a different location. In step 206, the onboard controllers 160 adjust the direction of travel of the crawlers 20 to move the production line 10 to a different location in response to the translocation signal. The onboard controllers 160 monitor the sensors 158 to confirm proper speed and direction of travel of the crawlers 20 during the translocation of the production line 10.

The above-described steps in the methods of FIGS. 6 and 7, are meant to be an illustrative examples, the steps may be performed synchronously, continuously, or in a different order depending upon the application.

The disclosure provides a production line crawler and cradle system for the conveying of vehicle components along a production line. The crawler and cradle system allow for the translocating of a production line and for the easy accessing of vehicle components at various stations along the production line. The crawlers also allow for the interchanging thereof, which allows the realigning of station tasks. Certain crawlers may be setup and assigned to certain stations along a production line. Since the crawlers are mobile they may be arranged in different orders. Thus, the systems and methods disclosed provide production line mobility and flexibility.

While the systems and methods have been described in connection with one or more embodiments, it is to be understood that the specific mechanisms and techniques which have been described are merely illustrative of the principles disclosed, and numerous modifications may be made to the methods and apparatus described without departing from the spirit and scope of this disclosure as defined by the appended claims.

We claim:

1. A method of manufacturing an aircraft comprising the steps of:
   supporting a plurality of aircraft components on a plurality of crawlers, each of the crawlers comprising at least one rolling track and a structural support for supporting the aircraft components;
   opposing a first plurality of lifting magnets coupled to an interior surface of said at least one rolling track and a second plurality of lifting magnets coupled to an exterior surface of the structural support to lift the structural support, such that the structural support floats between and within said at least one rolling track;
   adjusting magnetic fields experienced by said first and second plurality of lift magnets to translate said at least one rolling track, such that said crawlers move along the production line to a plurality of stations;
   generating a plurality of magnetic stability fields;
   cooling a plurality of superconducting devices to a temperature approximately between 60 and 80 Kelvin
   generating current within the plurality of superconducting devices of said crawlers to counteract changes in said magnetic stability fields, such that the rolling track is stabilized relative to the structural support; and
   performing at least one manufacturing task at each of said plurality of stations to manufacture the aircraft.

2. The method as in claim 1, wherein adjusting the magnetic fields controls the speed and direction of travel of the crawlers.

3. The method as in claim 1, further comprising:
   generating speed signals indicative of a speed of said at least one rolling track; and
   adjusting said magnetic fields in response to said speed signals to adjust the speed of said at least one rolling track.

4. The method as in claim 3, further comprising adjusting a direction of travel of the at least one rolling track by changing the polarity of the magnetic fields in response to said speed signals.

5. The method as in claim 4, further comprising:
generating location signals indicative of locations of said plurality of crawlers; and
adjusting said magnetic fields in response to said location signals.

6. A method of operating a production line comprising the steps of:
supporting equipment in the production line on a plurality of crawlers comprising at least one rolling track and a structural support for supporting the equipment;
opposing a first plurality of lifting magnets coupled to an interior surface of said at least one rolling track and a second plurality of lifting magnets coupled to an exterior surface of said structure support to lift the structural support, such that the structural support floats between and within said at least one rolling track;
adjusting magnetic fields experienced by said first and second plurality of lift magnets to translate said at least one rolling track, such that said crawlers move along the production line;
generating a plurality of magnetic stability fields; and
cooling a plurality of superconducting devices to a temperature approximately between 60 and 80 Kelvin
generating current within a plurality of superconducting devices of said crawlers to counteract changes in said magnetic stability fields, such that the rolling track is stabilized relative to the structural support.

7. The method as in claim 6, wherein adjusting the magnetic fields controls the speed and direction of travel of the crawlers.

8. The method as in claim 6, further comprising:
generating speed signals indicative of a speed of said at least one rolling track; and
adjusting said magnetic fields in response to said speed signals to adjust the speed of said at least one rolling track.

9. A method as in claim 8, further comprising adjusting a direction of travel of the at least one rolling track by changing the polarity of the magnetic fields in response to said speed signals.

10. The method as in claim 6, further comprising:
generating location signals indicative of locations of said plurality of crawlers; and
adjusting said magnetic fields in response to said location signals.

11. The method as in claim 6, further comprising:
generating speed signals indicative of a speed of said at least one rolling track;
adjusting said magnetic fields in response to said speed signals to adjust the speed of said at least one rolling track; and
adjusting a direction of travel of the at least one rolling track by changing the polarity of the magnetic fields in response to said speed signals.

12. The method as in claim 6, wherein the plurality of magnetic stability fields are generated by a first set of stability magnets outwardly residing on said at least one rolling track and a second set of stability magnets inwardly residing on said at least one rolling track.

13. The method as in claim 12, wherein at least a portion of said plurality of lifting magnets reside between said first set of stability magnets and said second set of stability magnets.

14. The method as in claim 6, further comprising supporting the equipment on a cradle coupled to and supported by said structural support, said cradle hanging below a top surface of said plurality of crawlers.

15. The method as in claim 14, wherein said cradle hangs below a top surface of said at least one rolling track.

16. The method as in claim 14, wherein said cradle hangs below a top surface of said structural support.

17. A method of supporting equipment in a production line comprising the steps of:
providing a crawler comprising at least one rolling track and a structural support for supporting the equipment;
opposing a first plurality of lifting magnets coupled to and extending around an interior surface of said rolling track and a second plurality of lifting magnets coupled to and extending around an exterior surface of said structure support to lift the structural support, such that the structural support floats between and within said rolling track;
adjusting magnetic fields experienced by said first and second plurality of lift magnets to translate said rolling track, such that said crawler moves along the production line;
providing a first set of stability magnets outwardly residing on said rolling track and a second set of stability magnets inwardly residing on said rolling track to generate a plurality of magnetic stability fields, such that at least a portion of said plurality of lifting magnets reside between said first set of stability magnets and said second set of stability magnets; and
generating current within a plurality of superconducting devices of said crawler to counteract changes in said magnetic stability fields and prevent shifting between said rolling track and the structural support.

18. The method as in claim 17, further comprising cooling said plurality of superconducting devices to a temperature approximately between 60 and 80 Kelvin.

19. The method as in claim 17, further comprising:
generating speed signals indicative of a speed of said rolling track;
adjusting said magnetic fields in response to said speed signals to adjust the speed of said at least one rolling track; and
adjusting a direction of travel of the at least one rolling track by changing the polarity of the magnetic fields in response to said speed signals.

* * * * *